C. L. REDFIELD.
PROCESS OF FORMING MATRICES.
No. 11,316. Reissued Mar. 28, 1893.
Fig. 1
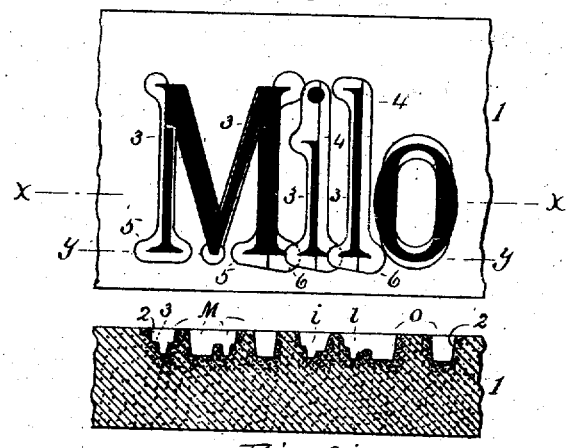
Fig. 2
Fig. 3
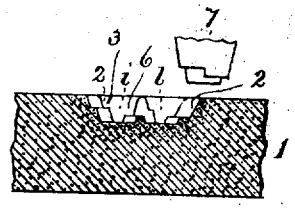
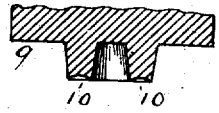
Fig. 4
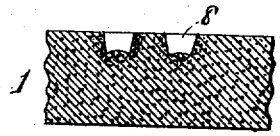
Fig. 5
Witnesses
R. Blume
C. Petchmi
Inventor
Casper L. Redfield
By his Attorney
P. H. Guncrel

UNITED STATES PATENT OFFICE.

CASPER L. REDFIELD, OF CHICAGO, ILLINOIS, ASSIGNOR TO THE CHICAGO MATRIX MACHINE COMPANY

PROCESS OF FORMING MATRICES.

SPECIFICATION forming part of Reissued Letters Patent No. 11,316, dated March 28, 1893.

Original No. 429,864, dated June 10, 1890. Application for reissue filed May 27, 1891. Serial No. 394,059.

*To all whom it may concern:*

Be it known that I, CASPER L. REDFIELD, a citizen of the United States, residing at Chicago, in the county of Cook and State of Illinois, have invented certain new and useful Improvements in the Process of Forming Matrices; and I do hereby declare the following to be a full, clear, and exact description of the invention.

My invention relates to the art of forming matrices from which to cast stereotype-plates for use in printing, and more especially to such matrices as are formed by the successive impression of separate type-dies into a matrix material.

The object of the invention is to provide a method of producing such matrices free from the imperfections usual therein, so as to enable plates having perfect type-faces to be cast therefrom. The imperfections in matrices made from type impressed in sequence usually arise from the partial filling or distortion of earlier impressions by the lateral displacement of the matrix material resulting from the forming of later impressions, and from such matrices it is impossible to cast plates having perfect type-faces. The impressions, to enable desirable plates to be cast therefrom, must have considerable depth in the matrix material as compared with the size of the faces of the characters themselves, and unless the body of the impressions back of the face is widened, portions of the impressions may not be reached by the metal, especially in the narrower lines, and imperfect type-faces will be the result.

It is the design of my invention to so form matrices that with each type-impression the surrounding body of matrix-material will be so far removed and compacted as that the succeeding impression will not affect the integrity of the type-face of the earlier impression, and the body of the impression back of the type-face will be sufficiently widened to permit perfect casts to be made and the plate and matrix easily separated. This I do by providing offsets in the impressions at suitable distances back of the type-faces. These offsets may be made to vary as to width and distance from the faces as the necessities of the case may require, and they may be provided only for the narrower stems of characters and for such portions of characters as are likely to be affected injuriously by succeeding impressions. Thus the hair-lines and feet of letters should be protected by the offset enlargements, while the heavy stems need no such protection; and, furthermore, I prefer that the offsets on the forward sides (the sides adjacent to the succeeding impressions) should be wider and nearer the character-faces than those in rear, and, also that the character faces in the impressions should have their stems (at least their wider stems) slightly convex in transverse section, in order that the characters on the plate cast therefrom may have their stems correspondingly concave, so as to present sharp margins and insure prints with sharply-defined outlines.

The preferable mode of forming such matrices is by means of type-dies of the character of those disclosed in my patent, No. 416,740, dated December 10, 1889, in which the dies are shown as having shoulders surrounding the feet and the hair-lines, or narrower stems, and the shoulders on the forward side are wider and nearer the type-face than on the opposite side. Such dies may be operated by means of any apparatus adapted to successively present and impress them into a matrix-body.

In the accompanying drawings, forming part of this application, Figure 1 is a plan view of a portion of a matrix strip or body, upon which is impressed the word "Milo," in conformity with my process. Fig. 2 shows a longitudinal section of the same through the middle of the letters on the line $x$—$x$ of Fig. 1; Fig. 3 a similar section on the line $y$—$y$ through the feet of the letters, showing only the impressions for the letters i and l, and showing a die in position to form a second impression of the letter l. Figs. 4 and 5 show, respectively, a vertical section of a die for the letter o, having the stems of its face concave in cross-section, and a sectional view of a matrix-body, showing the impression formed by such die.

In said drawings, 1 designates a portion of a matrix strip or body of paper or any suitable material, and M-i-l-o designate the respective character-impressions of the series shown therein. The impressions for these selected letters will sufficiently illustrate the method of forming the matrix, for the impressions for other letters and characters would show like characteristics. The letter faces or bottoms of the impressions are indicated by the reference-letters above given, and the side walls of the impressions by the figure 2. These walls and the walls at the head and foot of the impressions as well are preferably made to slope inward from the matrix surface to the character-face, about as shown in Figs. 2 and 3, so that they will be considerably farther apart near the surface than toward the bottom. At both sides of the narrower stems of the letter M in the impression are offsets 3, which, as these stems are not likely to be effected by any crowding effect of a succeeding impression, may be of like width and depth, as shown. The letters i and l have the left or rear sides of their stems protected by like offsets 3, while their right or forward sides are protected by offsets 4, that are wider and nearer the character-faces than the offsets 3. The sides of the letter o may be without the offsets, and the narrower and shallower offsets 3 provided only for the thinner lines of the head and foot of the letter. The feet of the letters have provided for their left or rear portions offsets 5, that are wider but of the same depth as the offsets, 3, for the stems, and for the right or front portions are provided offsets 6, that are both wider and deeper, or nearer the character-face, than the offsets 3 and 5; and so for the heads of the letters offsets are provided at the rear similar to those designated 3 and 5, and at the front similar to those indicated by 6. For other letters than those shown the same method should be followed, viz—that of providing offsets in the matrix for the narrower lines and heads and feet of the character-impressions and making the forward offsets wider and nearer the face than the others. In this manner the matrix material is compressed around the sides of the portions of the face-impression needing protection, and as each succeeding impression is made the wider offset portion in advance of an impression already made furnishes a compacted body upon which the type-face of the narrower rear offset of the latter impression may be formed without detriment to the character-face or materially narrowing the earlier impression as a whole. Thus, as will be apparent from Fig. 3, the formation of the letter l by the depression of the suspended die 7 can be effected without crowding over matrix material to materially interfere with the previously-formed impression l, because of the offsets provided in the latter.

For the purpose of giving the sides of the main stems of characters in print a sharp outline the matrix-impressions may be slightly convex transversely to the stems, as shown at 8 in Fig. 5. This may be done by having the die made with its face transversely concave, as shown at 10, Fig. 4.

What I claim, and desire to secure by Letters Patent, is—

1. The process of forming matrices for stereotype-plates which consists in impressing dies in sequence into a matrix-body, and compressing material at the sides of the paths of the type-faces and forming offsets in the walls of the impressions, substantially as set forth.

2. The process of forming matrices for stereotype-plates which consists in forming the impressions successively by dies and compressing the matrix material unequally at both sides of the path of the type-face to produce varying offsets in the walls, substantially as set forth.

3. The process of forming matrices for stereotype-plates which consists in forming the impressions successively by dies and compressing the matrix material unequally at both sides of the path of the type-face to form offsets in the walls of greater width at the front than in rear of the character-face, substantially as set forth.

4. The process of forming matrices for stereotype-plates which consists in forming the impressions successively by dies and compressing the matrix material unequally at both sides of the path of the type-face to form offsets in the walls of greater depth at the front than in rear of the character-face, substantially as set forth.

5. The process of forming matrices for stereotype-plates, which consists in forming the impressions successively by dies and compressing the matrix material unequally at both sides of the path of the type-face to form offsets in the walls of greater width and depth at the front than in rear of the character-face, substantially as set forth.

6. The process of forming matrices for stereotype-plates, which consists in forming the impressions in succession by dies and compressing the matrix material at both sides of the path of the type-face to form shoulders in the walls adjacent to the hair-lines of the character-faces, substantially as set forth.

7. The process of forming matrices for stereotype-plates, which consists in forming impressions by successively impressed dies and compressing the matrix material both laterally and parallel to the path of the type-face to form sloping walls and offsets therein, substantially as set forth.

8. The method of forming matrices for stereotype-plates, which consists in compacting in downward direction only matrix material adjacent to the character impressions to less depth than the character impressions.

9. A matrix for stereotype-plates having its impressions wider than the character-faces and their walls provided with offsets, substantially as set forth.

10. A matrix for stereotype-plates, having the walls of its impressions sloping outward from the character-faces and provided with offsets, substantially as set forth.

11. The method of forming stereotype matrices, which consists in making successive type-face impressions in a matrix material, compacting material adjacent to character impressions and forming offsets in the compacted portions of materials.

12. The method of forming matrices for stereotype-plates, which consists in compacting in downward direction matrix material adjacent to the character impressions to less depth than the character impressions.

13. The method of forming stereotype-matrices, which consists in forming successive character impressions in a matrix material and in compacting in downward direction to less depth material adjacent to such impressions simultaneously with their formation.

14. The method of forming stereotype-matrices, which consists in making the impressions in the matrix material successively, compressing downward to less depth material adjacent to the face-impressions, and inclining the walls of such impressions.

15. The method of forming matrices, which consists in simultaneously forming in a matrix body a character-impression and an impression lateral and parallel thereto but of less depth, and in making the successive impressions partly in the material compacted by such lateral impressions 16. The method of forming stereotype-matrices, which consists in forming the impressions successively by dies, inclining the walls of the impressions from the type-face outward, and forming offsets in the walls, for the purpose set forth.

17. The method of forming stereotype-matrices by the successive impression of single dies into a matrix body, which consists in successively impressing the dies and in forming offsets in the walls of the impressions parallel to their type-faces for the purpose set forth.

18. A matrix for stereotype-plates, having the walls of its impressions provided with offsets on planes parallel with the type-faces, substantially as set forth.

CASPER L. REDFIELD.

Witnesses:
E. B. SPRINGER,
W. B. SHARP.